United States Patent [19]

Heerdink et al.

[11] Patent Number: 4,609,063
[45] Date of Patent: Sep. 2, 1986

[54] VEHICLE HOOD MOUNTING

[75] Inventors: Robert J. Heerdink, Bloomfield; James L. Vogt, Ottumwa, both of Iowa

[73] Assignee: Deere & Company, Moline, Ill.

[21] Appl. No.: 737,847

[22] Filed: May 24, 1985

[51] Int. Cl.$^4$ .............................................. B62D 25/10
[52] U.S. Cl. ................................. 180/69.23; 296/35.1; 403/116
[58] Field of Search ................ 52/167; 296/35.1, 190; 403/116, 117; 180/69.22, 69.23, 69.2

[56] References Cited

U.S. PATENT DOCUMENTS

| | | | |
|---|---|---|---|
| 420,112 | 1/1890 | Shults | 403/116 |
| 1,140,503 | 5/1915 | Cummins | 180/69.23 |
| 1,446,814 | 2/1923 | Scott | 180/69.23 |
| 4,106,808 | 8/1978 | Hyde | 403/407.1 X |

Primary Examiner—John J. Love
Assistant Examiner—Michael Mar

[57] ABSTRACT

A vehicle hood has a first end rigidly supported to a vehicle frame while a second end of the hood is yieldably or resiliently supported to the frame through side panels so that twisting motions of the frame are not transmitted to the hood or side panels.

5 Claims, 7 Drawing Figures

VEHICLE HOOD MOUNTING

BACKGROUND OF THE INVENTION

The present invention relates to engine compartments and more particularly relates to mountings for side sheets and hoods defining such compartments.

A known vehicle includes a main frame to which side panels are bolted to form a box structure which has its top closed by a hood bolted to the side panels. Due to frame bending and twisting during operation, forces are transmitted into the side panels and hood causing fatigue cracks to develop in these light sheet metal parts.

SUMMARY OF THE INVENTION

According to the present invention there is provided an improved mounting design for securing engine compartment side panels to a vehicle frame and to a hood.

An object of the invention is to provide means for mounting engine compartment hood and panel structures to each other and to a vehicle frame so as to reduce stresses induced therein by frame twisting and bending motions during operation.

A more specific object is to provide a combination of rigid and flexible joints between the hood and panels, and between the panels and the frame so as to reduce the amount of stress induced in the panels and hood by frame twisting and bending motions.

These and other objects, features and advantages of the present invention will become apparent to those skilled in the art from the description which follows and from the drawings.

DESCRIPTION OF THE PREFERRED EMBODIMENT

Figure 1:
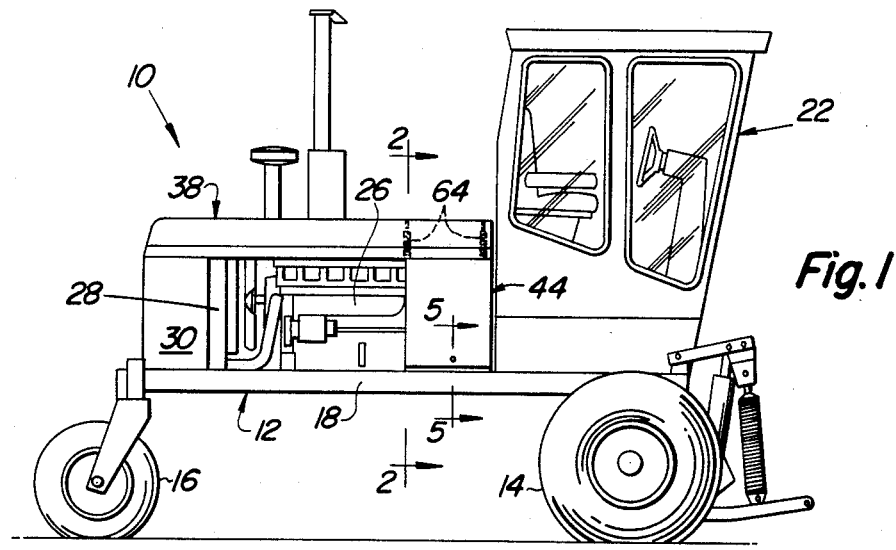
FIG. 1 is a right side elevational view of a windrower having a hood and panel structure embodying the present invention.

Referring now to FIG. 1, there is shown a self-propelled windrower vehicle 10, which is merely representative of the type of vehicle with which the present invention is usable. The vehicle 10 includes a fore-and-aft extending main frame 12 supported on a pair of front drive wheels 14 and a pair of rear castered wheels 16. The frame 12 includes a pair of fore-and-aft extending, laterally spaced channel members 18 (FIG. 2) having horizontal top surfaces 20. Mounted on the frame 12 in serial fashion from front to rear are an operator's cab 22, a fuel tank (not visible) an engine 26, and a radiator and fan assembly of which only a support structure 28 is visible.

Figure 2:
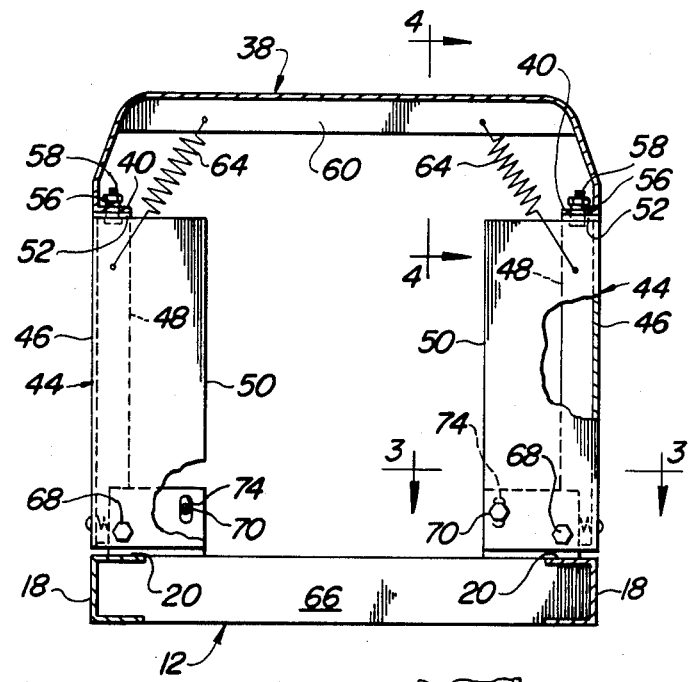
FIG. 2 is a vertical sectional view taken along line 2—2 of FIG. 1 showing the semi-rigid connection between the front side panels and the main frame and the flexible connection between the front end of the hood and the tops of the front side panels.
Figure 3:
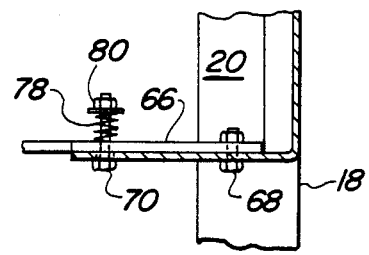
FIG. 3 is a horizontal sectional view taken along line 3—3 of FIG. 2 and showing the right-hand semi-rigid connection illustrated in FIG. 2.
Figure 4:
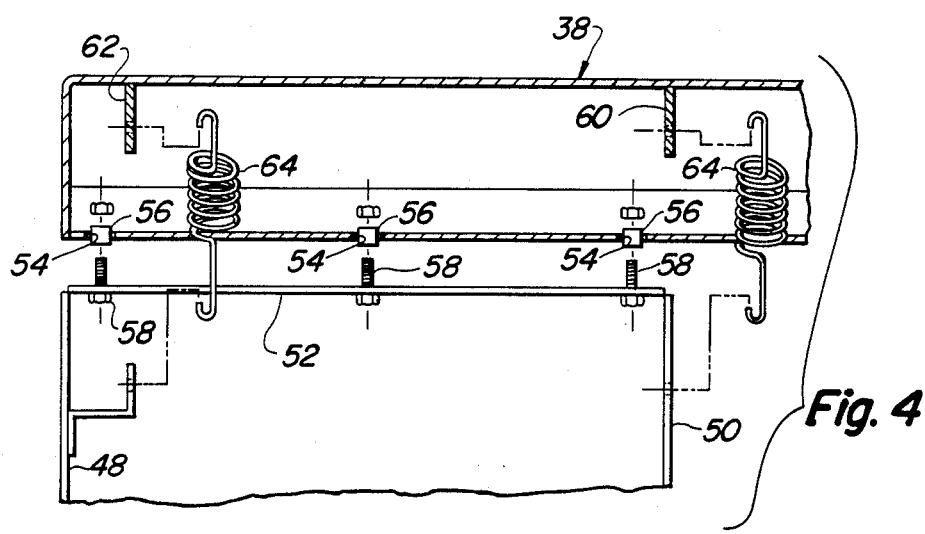
FIG. 4 is an exploded vertical sectional view taken along line 4—4 of FIG. 2 showing the flexible connection between the right front side of the hood and the right front panel.
Figure 7:
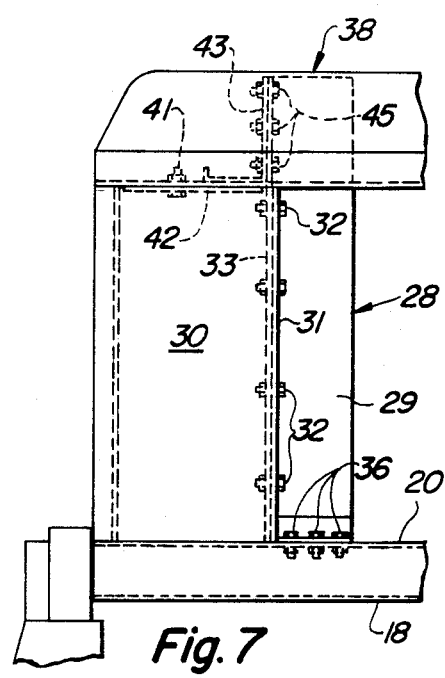
FIG. 7 is a right side elevational view showing the radiator support and its connection with the rear of the hood, the right rear side panel and the frame.

The support structure 28 spans the channel members 18 and includes upright angular side members of which only the right side member 29 is shown. A rear pair of side panels 30 each having a vertical transverse flange 31 is bolted, as at 32, to a vertical transverse flange 33 of the side member 29. Formed at the bottom of the member 29 is an angle member 34 which is rigidly secured to the top surface 20 of the beams 18 by bolts 36. A hood 38 extends lengthwise above the fuel tank, engine and radiator and fan assembly. The hood 38 has a top which is arched from side to side as viewed from its end with the opposite sides of the arch terminating in horizontal mounting flanges 40 (FIG. 2). As can best be seen in FIG. 7, the rearward end of the hood 38 is bolted as at 41, to horizontal top portions 42 of the side panels 30. Secured at the juncture between the top and opposite sides of the hood are brackets 43 (only one shown) which are bolted to an upper portion of the flange 33, as at 45. This results in the hood 38 being rigidly mounted to the frame 12.

A front pair of side panels 44 extend between the frame 12 and the hood 38. The panels 44 each have a rectangular fore-and-aft side portion 46 located between and joined to a relatively short, inturned vertical front flange 48 and to a vertical transverse rear portion 50. A horizontal inturned flange 52 is joined to the top of each panel side portion 46. Each flange 40 of the hood 38 is provided with fore-and-aft spaced clearance holes 54 and received in the holes 54 are bushings 56 that are bolted, as at 58, to the tops of the horizontal flanges 52 of the panels 44. The underside of the top of the hood 38 is provided with first and second vertical ribs 60 and 62 respectively located in substantial vertical alignment with the rear portions 50 and vertical flanges 48 of the panels 44. Yieldably holding the hood 38 in place on the bushings 56 are four relatively stiff tension springs 64, two of which extend between the rib 60 and the transverse portions 50 of the panels 44 and two of which extend between the rib 62 and respective tabs integral with the vertical flanges 48 of the panels 44.

The main frame 12 includes a cross member 66 connected to the webs 20 of frame members 18 in the vicinity of the transverse portions 50 of the side panels 44. A first bolt 68 extends through holes 67 provided in and secures each of the portions 50 to the cross member 66. A second bolt 70 extends through holes 72 provided in each of the portions 50 and through respective vertically elongated holes 74 provided in the cross member 66 at respective locations inwardly of the bolts 68. A coil compression spring 78 is held on each bolt 70 by an associated nut 80. The elongated hole in each portion 66 through which the bolt 70 passes permits the bolt 70 to move therein when the frame 12 undergoes twisting movements about its longitudinal axis, the panels 44 then pivot or flex about their connections established by the bolts 68.

Figure 5:
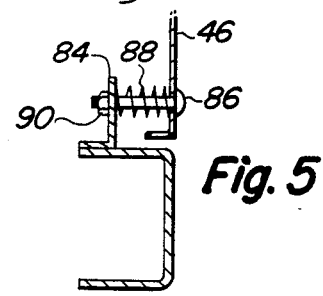
FIG. 5 is an enlarged vertical sectional view taken along line 5—5 of FIG. 1 and showing the flexible connection between the right side panel and the frame.
Figure 6:
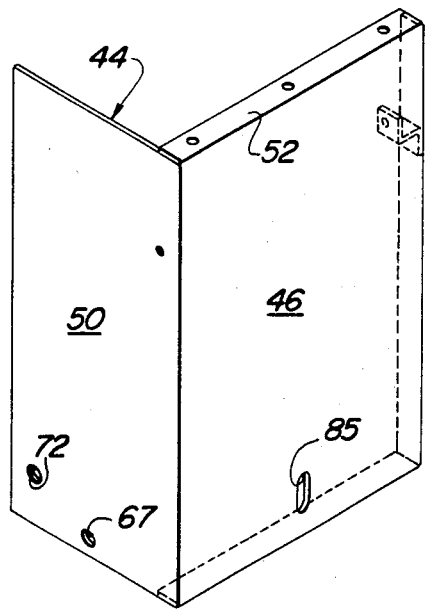
FIG. 6 is a right rear perspective view of the right front side panel showing the mounting holes located therein.

Fixed to the tops 20 of the frame members 18 inwardly of and in spaced parallel relationship to the side portions 46 of the panel 44 are brackets 84 (FIG. 5). The brackets 84 are located approximately midway between the front and rear of the portions 46 and received through a vertical slot 85 inside each portion 46 and an associated bracket 84 is a relatively long bolt 86 carrying a coil compression spring 88 located between the bracket 84 and the side portion 46. A nut 90 is received on each bolt 86 and may be tightened or loosened so as to dispose the panel side portion 46 in correct fore-and-aft alignment with opposite sidewalls of the operator's cab 22.

Thus, it will be appreciated that only the rearward end of the hood 38 is rigidly secured to the frame 12 and this securement being shown here by the rear end of the hood being rigidly bolted to the radiator support structure 28 which is in turn rigidly bolted to the frame. It will be appreciated then that the hood 38 will tend to follow the movement of the rear portion of the frame 12 when the latter undergoes twisting movements about a longitudinal axis located centrally between frame members 18. Because the forward end of the hood 38 is resiliently coupled to the tops of the front side panels 44, one or the other of the joints between the side panels 44 and hood 38 will act to permit relative hinge-like movement between the side panels 44 and hood in accordance with twisting movements of the frame 12, it being noted that the bolts 68 provide vertical support for the forward end of the hood while permitting the panels 44 to pivot from side to side and slip through the resilient connections at the bolts 70 and 86 as permitted by the slots 82 and 85.

We claim:

1. In a vehicle including a fore-and-aft extending main frame supporting an engine and a one-piece hood extending above and defining a top of a compartment for the engine, the improvement comprising a hood mounting assembly, comprising: a first hood support means extending between one end of the hood and said frame and rigidly supporting said one end of the hood in vertically spaced relationship to said frame; a second hood support means extending between said frame and a second end of the hood and including first connection means associated with the hood for establishing fore and aft hinge means and second connection means associated with the frame for establishing fore and aft pivot means for permitting the frame to twist about a longitudinal axis thereof without transmitting such twisting movements to the hood; and said first and second hood support means being the sole support for said hood and said hood being supported only at its one and second ends.

2. The vehicle defined in claim 1 wherein said second hood support means includes first and second side panels extending between the hood and frame and said first connection means includes spring means yieldably joining said hood and side panels together to establish said hinge means.

3. The vehicle defined in claim 1 wherein said second hood support means includes first and second side panels each having an end portion extending transversely to a normal direction of travel of the vehicle; and said second connection means including a first fore-and-aft extending bolt securing each panel end portion to the frame.

4. The vehicle defined in claim 3 wherein said second connection means is further defined by a structure wherein the frame includes a vertical transverse member provided at opposite ends thereof with a vertically elongated opening aligned with a bolt hole provided in each end portion of the side panels at a location inwardly of the first bolt; a second bolt received through each said aligned bolt hole and vertically elongated opening; and a coil compression spring mounted on said second bolt and held in place by a nut, whereby each side panel may pivot about its associated first bolt while its associated second bolt moves within the elongated opening.

5. The vehicle defined in claim 4 wherein the lost motion connection means further includes a second vertically elongated opening located in each panel in a fore-and-aft extending portion thereof; a third bolt extending through the slot and through a portion of the frame spaced inwardly from the fore-and-aft extending portion of the panel; a coil compression spring located on the third bolt between the portion of the frame and the fore-and-aft extending portion of the panel; and a nut received on the bolt for adjusting the sideways disposition of the fore-and-aft extending portion of the side panel.

* * * * *